United States Patent
Josselson

(10) Patent No.: US 7,729,816 B1
(45) Date of Patent: Jun. 1, 2010

(54) SYSTEM AND METHOD FOR CORRECTING ATTITUDE ESTIMATION

(75) Inventor: Robert H. Josselson, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1096 days.

(21) Appl. No.: 11/337,889

(22) Filed: Jan. 23, 2006

(51) Int. Cl.
*G05D 1/08* (2006.01)

(52) U.S. Cl. .................. 701/4; 701/1; 701/3; 701/5; 701/8; 701/9; 701/10; 701/14

(58) Field of Classification Search ............... 701/3–18
See application file for complete search history.

(56) References Cited

U.S. PATENT DOCUMENTS

| | | | | |
|---|---|---|---|---|
| 3,984,068 A | * | 10/1976 | McPhee | 244/3.19 |
| 4,831,318 A | | 5/1989 | Yuasa et al. | |
| 5,557,285 A | | 9/1996 | Bender et al. | |
| 5,949,675 A | * | 9/1999 | Holmes et al. | 700/37 |
| 2002/0027878 A1 | * | 3/2002 | McDermott et al. | 370/221 |

* cited by examiner

*Primary Examiner*—Khoi Tran
*Assistant Examiner*—Bhavesh V Amin
(74) *Attorney, Agent, or Firm*—Ratnerprestia

(57) ABSTRACT

A system includes an angular rate sensor disposed in a vehicle for providing angular rates of the vehicle, and an instrument disposed in the vehicle for providing line-of-sight control with respect to a line-of-sight reference. The instrument includes an integrator which is configured to integrate the angular rates of the vehicle to form non-compensated attitudes. Also included is a compensator coupled across the integrator, in a feed-forward loop, for receiving the angular rates of the vehicle and outputting compensated angular rates of the vehicle. A summer combines the non-compensated attitudes and the compensated angular rates of the to vehicle to form estimated vehicle attitudes for controlling the instrument with respect to the line-of-sight reference. The compensator is configured to provide error compensation to the instrument free-of any feedback loop that uses an error signal. The compensator may include a transfer function providing a fixed gain to the received angular rates of the vehicle. The compensator may, alternatively, include a is transfer function providing a variable gain as a function of frequency to operate on the received angular rates of the vehicle.

17 Claims, 6 Drawing Sheets

SYSTEM AND METHOD FOR CORRECTING ATTITUDE ESTIMATION

STATEMENT REGARDING FEDERALLY SPONSORED RESEARCH

The invention described herein was made in the performance of work under NASA Contract No. NNG04HZ07C and is subject to the provisions of Section 305 of the National Aeronautics and Space Act of 1958 (42 U.S.C. 2457).

TECHNICAL FIELD

The present invention relates, in general, to attitude correction of an instrument controlling its own line-of-sight. More specifically, the present invention relates to a lead compensator to correct for rate sensor dynamics and data transfer latency between a sensor disposed in a vehicle and an instrument controlling its own line-of-sight.

BACKGROUND OF THE INVENTION

A geostationary satellite maintains its orbit and attitude such that its z-axis points to a sub-satellite point or to nadir. The spacecraft control system maintains the satellite 3-axis attitude (roll, pitch, and yaw) near 0° for all three axes, typically with less than 0.1° error. The spacecraft angular rates are usually small and less than several hundred μradians/second.

The spacecraft has an Inertial Reference Unit (IRU) that provides Euler attitudes and body-fixed angular rate measurements. One representation for the Euler angle rates in terms of the body-fixed rates is:

$$\begin{bmatrix} \dot{\phi} \\ \dot{\theta} \\ \dot{\psi} \end{bmatrix} = \begin{bmatrix} \omega_x \cos(\psi) - \omega_y \sin(\psi) \\ \omega_e + [\omega_x \sin(\psi) + \omega_y \cos(\psi)]/\cos(\phi) \\ \omega_z + [\omega_x \sin(\psi) + \omega_y \cos(\psi)] \sin(\phi)/\cos(\phi) \end{bmatrix} \quad (1)$$

where $\phi$ is the spacecraft Euler roll angle
$\theta$ is the spacecraft Euler pitch angle
$\psi$ is the spacecraft Euler yaw angle
$\omega_e$ is the Earth's sidereal rate
$\omega_x$ is the spacecraft x-axis angular rate
$\omega_y$ is the spacecraft y-axis angular rate
$\omega_z$ is the spacecraft z-axis angular rate For small angles and for small angular rates Eq. 1 can be approximated by $$\begin{bmatrix} \dot{\phi} \\ \dot{\theta} \\ \dot{\psi} \end{bmatrix} \approx \begin{bmatrix} \omega_x \\ \omega_e + \omega_y \\ \omega_z \end{bmatrix} \quad (2)$$

Equation 2 shows that, for small angles and small rates, the body-fixed rates measured by the IRU may be directly integrated to obtain the spacecraft attitude in terms of its Euler angles.

A scanning instrument on the spacecraft bus needs to accurately maintain its own line-of-sight in inertial space. To do so the instrument needs to compensate for any spacecraft motion. The spacecraft's inertial reference unit (IRU) provides the spacecraft's attitude and rate to the instrument. The instrument then uses the information to adjust its own line-of-sight equal and opposite to the motion of the spacecraft.

Ideally the instrument would directly use the attitude of the spacecraft as measured by the IRU to move its own line-of-sight, equal and opposite to that of the spacecraft. The attitude data provided by the IRU, unfortunately, may not be accurate enough because, for example, the spacecraft's star trackers may not be sufficiently accurate. The instrument may need more accurate spacecraft attitude data than the IRU can supply, in order to compensate for the spacecraft's motion and satisfy the instrument's line-of-sight pointing requirements.

To overcome the IRU's inadequate attitude measurements, the IRU's rate sensor data are used by the instrument, in addition to the spacecraft IRU's attitude data. Over short periods of time (for example, less than 10 minutes), the spacecraft provided IRU rate data are integrated (Eq. 2) from an initial attitude into spacecraft attitude. The instrument's attitude is, thus, more accurate because the instrument uses the more accurate body-fixed rate data instead of the less accurate IRU attitude data, over the short time period.

During integration of the IRU rate data to derive attitude data, unfortunately, errors are caused by the latency in data transfer of the rate data from the spacecraft to the instrument. Additional errors may be caused by the spacecraft's IRU dynamics. The dynamic response of the IRU rate sensor, for example one having a 10 Hz second order bandwidth, introduces an amplitude error and a phase shift to any sensed spacecraft sinusoidal motion.

As will be explained, the present invention provides a lead compensator to correct for the rate sensor dynamics and data transfer latency between (1) a sensor, such as an IRU rate sensor disposed in a vehicle (or spacecraft) and (2) an instrument, such as an imaging device disposed in the same vehicle (or spacecraft) that controls its own line-of-sight.

SUMMARY OF THE INVENTION

To meet this and other needs, and in view of its purposes, the present invention provides a compensator for reducing attitude errors in orientation of a line-of-sight controlled by an instrument. The compensator includes a transfer function module configured to operate on an input signal and, in response, provide a compensated output signal. The transfer function module is coupled to an angular rate sensor for receiving, as the input signal, angular rates from the angular rate sensor, and the transfer function module is coupled to the instrument for providing compensated angular rates as the compensated output signal.

The transfer function module operates in an open loop mode to reduce the attitude errors of the instrument, and operates free-of any feedback loop. The transfer function module may operate as a function having fixed gain between the input signal and the compensated output signal. The transfer function module may also operate as a function having gain that varies as a function of frequency between the input signal and the compensated output signal.

An integrator is coupled in parallel with the transfer function module for integrating the input signal and providing a non-compensated output signal. A summer is included for adding the non-compensated output signal and the compensated output signal to form estimated attitudes of the instrument.

An inertial reference unit (IRU), an inertial measuring unit (IMU), or both, may be included for providing an attitude reference signal directly to the summer, so that the summer may add the attitude reference signal to both, the non-compensated output signal and the compensated output signal, to form the estimated attitudes of the instrument.

Another embodiment of the present invention is a system including an angular rate sensor disposed in a vehicle for providing angular rates of the vehicle, and an instrument disposed in the vehicle for providing attitude control with respect to its own line-of-sight reference. The instrument includes an integrator configured to integrate the angular rates of the vehicle to form non-compensated attitudes. A compensator is coupled across the integrator, in a feed forward loop, for receiving the angular rates of the vehicle and outputting compensated angular rates of the vehicle. A summer is also included for combining the non-compensated attitudes and the compensated angular rates of the vehicle to form estimated vehicle attitudes for controlling the line-of-sight reference.

The compensator is configured to provide error compensation to the instrument, free-of any feedback loop operating on an error signal. The compensator includes a transfer function providing a fixed gain to the received angular rates of the vehicle and outputting the compensated angular rates of the vehicle. The compensator may, alternatively, include a transfer function providing a variable gain as a function of frequency to operate on the received angular rates of the vehicle and output the compensated angular rates of the vehicle.

Yet another embodiment of the invention is a method of reducing attitude errors in the orientation of an instrument, where the instrument is disposed on a vehicle. The method includes (a) providing angular rates to the instrument from an inertial sensor disposed in the vehicle; (b) integrating the angular rates, in the instrument, to provide non-compensated attitudes for controlling a line-of-sight of the instrument; (c) multiplying the angular rates from the inertial sensor, in the instrument, by a predetermined transfer function to provide compensated angular rates; and (d) summing the non-compensated attitudes and the compensated angular rates to provide estimated vehicle attitudes for controlling the line-of-sight of the instrument.

Step (c) of the method of the invention may include multiplying the angular rates by a fixed constant value, or multiplying the angular rates by a value that varies as a function of frequency. The method uses the estimated vehicle attitudes for controlling the line-of-sight of the instrument, and is configured to be free-of any feedback error loop from the instrument and free-of any feedback error loop from the vehicle.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

As will be explained, the present invention compensates for data latency and for rate sensor phase lags during attitude updates sent to an instrument (or device) that steers (or controls) its own line-of-sight in inertial space (for example, by moving the instrument's mirrors for imaging a point of interest). The attitude updates are sent from a sensor disposed in a vehicle to the instrument that may be disposed in the same vehicle. The present invention accomplishes this compensation by directly modifying the vehicle's rate sensor data using an ingenious feed-forward architecture.

Conventional closed loop compensation techniques use a compensator that operates on an error feedback signal. Unfortunately, an instrument (or device) using vehicle (or spacecraft) provided inertial data is not configured to operate in a closed loop mode. In fact, the instrument operates in an open loop mode with the vehicle (or spacecraft) provided inertial data. Feedback from the instrument to the spacecraft is non-existent. As will be explained, the present invention, on the other hand, provides an instrument that operates in an open loop mode when using the vehicle's (or spacecraft's) inertial data.

Furthermore, a conventional closed loop compensation technique provides lead compensation that includes derivative action. This is inherently a noisy process and can introduce significant errors in the compensation technique. The present invention advantageously overcomes use of a noisy compensator and the absence of a feedback loop. The present invention accomplishes these advantages by directly sending the rate output signals from an inertial sensor, as a derivative of attitude, to a compensator that provides lead compensation using an open loop feed-forward configuration.

Figure 1:
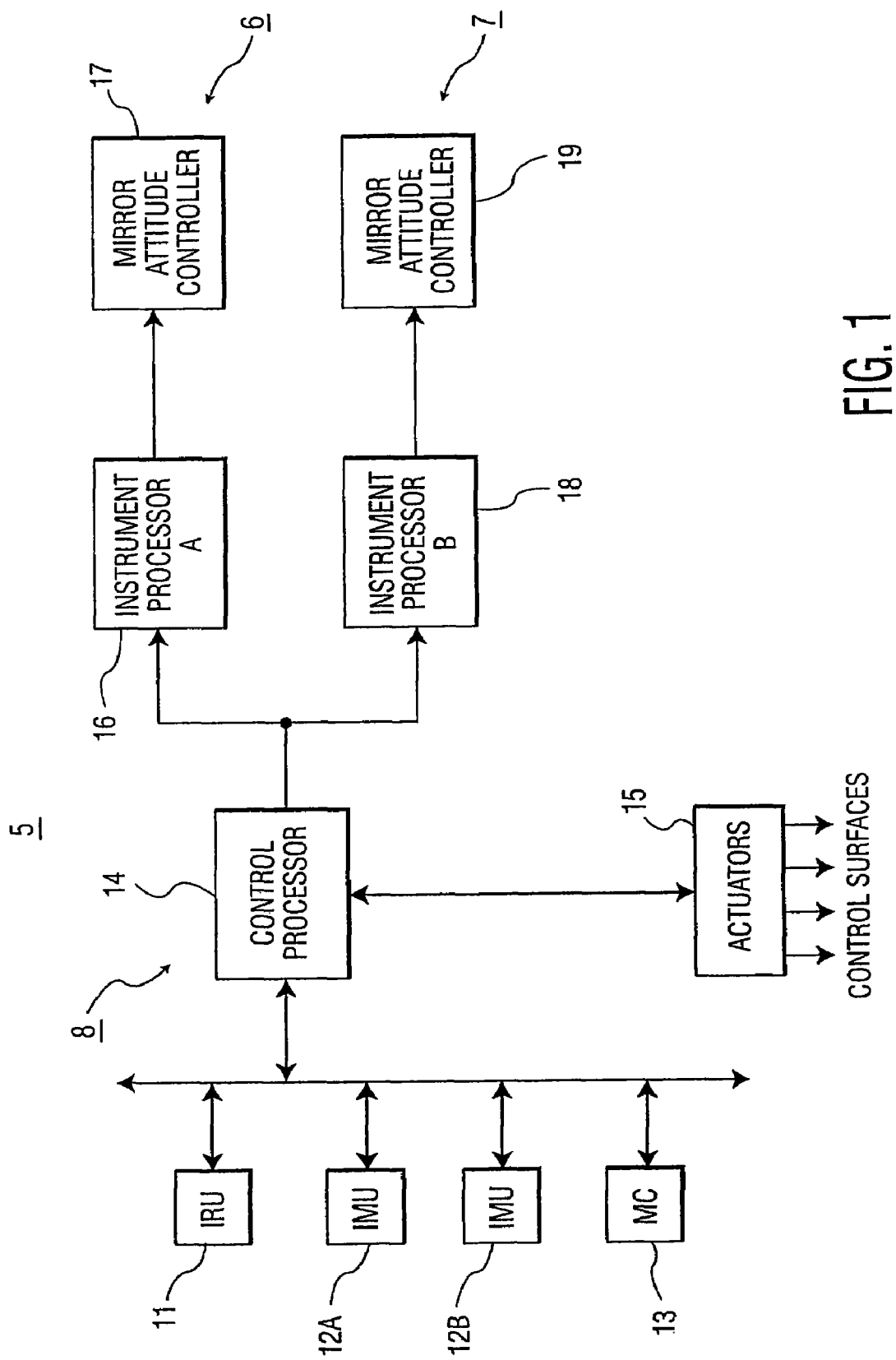
FIG. 1 is a functional block diagram depicting an inertial navigation system communicating with multiple instruments onboard a vehicle, in accordance with an embodiment of the present invention.

Referring to FIG. 1, there is shown a portion of spacecraft 5, which includes an inertial navigation suite, generally designated as 8, interfacing with two onboard instruments, generally designated as 6 and 7, respectively. As shown, inertial navigation suite 8 includes inertial reference unit (IRU) 11, inertial measuring unit (IMU) 12A, IMU 12B and motion compensation (MC) unit 13. Each of these units is coupled, by way of a vehicle (or spacecraft) bus, to control processor 14. Control processor 14 provides attitude data, attitude rate data, etc. to actuators 15 for controlling different actuators or effectuators (such as thrusters or momentum wheels) of the vehicle (or spacecraft). Control processor 14 also provides attitude data and angular rate data to instrument processor A, designated as 16, and instrument processor B, designated as 18.

It will be appreciated that both instruments, for example, may be imaging devices or laser sensor devices for imaging or sensing a point of interest on the earth. As shown, instrument processor 16 and instrument processor 18, respectively, provide attitude data to control a line-of-sight from a respective instrument to the earth, by way of mirror attitude controller 17 and mirror attitude controller 19, for example.

It will be understood that inertial navigation suite 8 may include a different mix of inertial sensors and a differently configured motion compensator unit than those shown in FIG. 1. Similarly, the set of instruments may be different than the two instruments shown in FIG. 1. For example, an instrument may include an imaging radar and, instead of controlling the orientation of a mirror, the imaging radar may control the line-of-sight of a radar antenna pointing at a target of interest. It will also be understood that although a separate processor is shown for the inertial reference suite and a different set of processors are shown for the instruments, these processors may be combined into one integrated processor that is configured to control the actuators or effectuators of the vehicle and the orientation of each line-of-sight of a respective instrument.

Each instrument on a spacecraft needs to accurately maintain its line-of-sight in inertial space. To do so, the instrument needs to compensate for any spacecraft motion. The spacecraft's IRU (for example) may provide the spacecraft's attitude data and rate data to each instrument. Each instrument, in turn, uses the data, when received from control processor 14 (for example), to adjust its own line-of-sight so that it is equal and opposite to the motion of the spacecraft. The attitude data may be provided by the IRU, the IMU, or any other attitude reference unit in the spacecraft.

Figure 2:
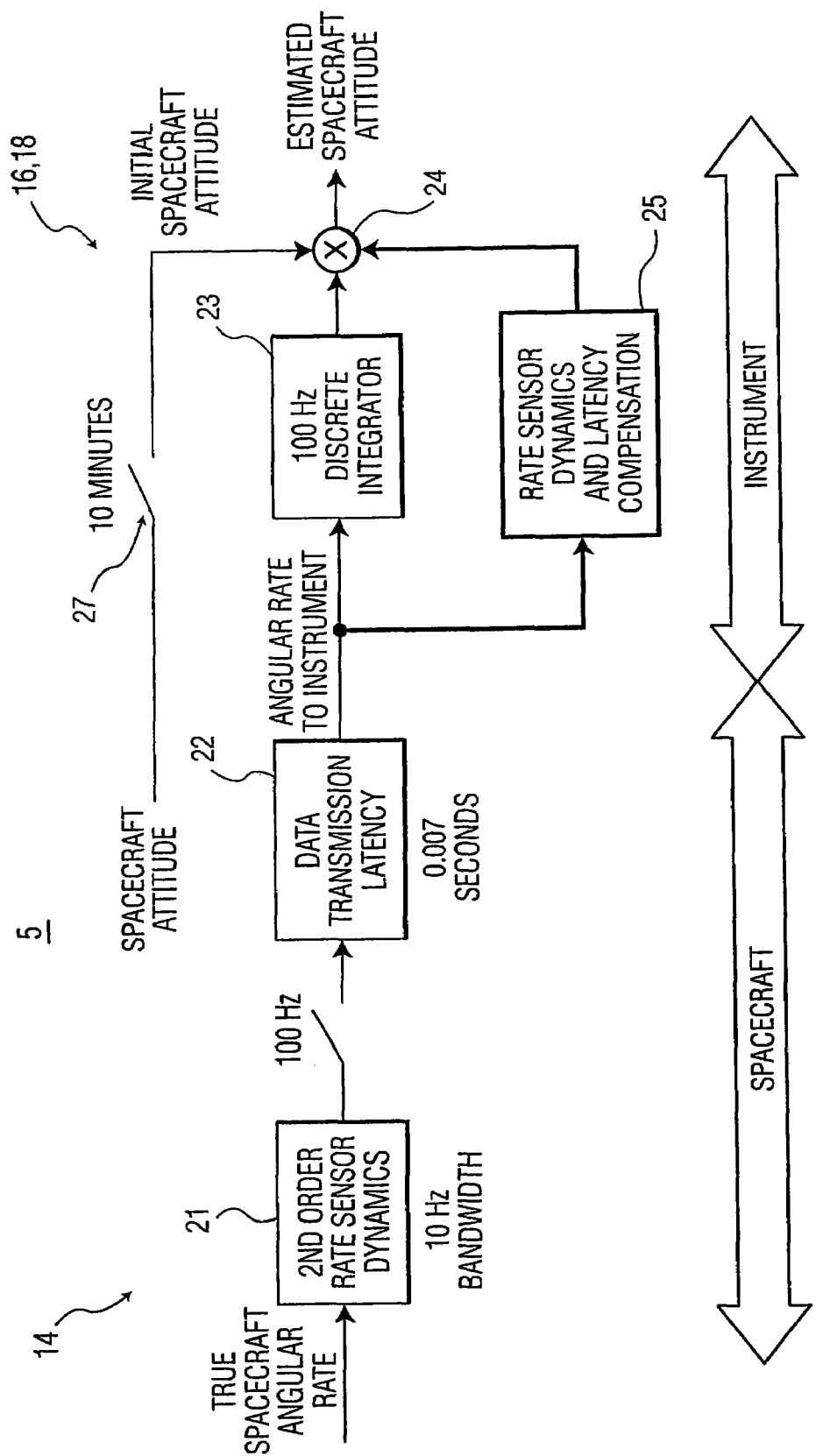
FIG. 2 is a detailed block diagram showing communications between an angular rate sensor and an instrument providing estimated attitude data to control its own line-of-sight, in accordance with an embodiment of the present invention.

Referring next to FIG. 2, there is shown control processor 14 interfacing with instrument processor A or instrument processor B, respectively designated as 16 and 18. As shown, angular rate sensor 21 is modeled as a second order rate sensor having 10 Hz of bandwidth. The angular rate sensor provides angular rate data to the instrument, by way of a modeled data transmission latency of 0.007 seconds.

The angular rates provided to the instrument introduce amplitude errors and phase shifts to the actual spacecraft motion. The phase shift is equivalent to additional time delay in the rate data, which is a time delay similar to the latency caused by the transfer of data from the spacecraft to the instrument. The angular is rates from control processor 14 are provided, for example, to a 100 Hz discrete integrator, designated as 23, and provided to a rate sensor dynamics and latency compensator, designated as 25.

As also shown in FIG. 2, the spacecraft attitude data are used to initialize the estimated spacecraft attitudes at the start of the compensation process. The attitude data are periodically reinitialized every 10 minutes (for example). Such attitude data may be provided by way of a sample and hold circuit, which is schematically shown as switch 27. Accordingly, summer 24 provides the summation of three output signals. One output signal is the long term spacecraft attitude data to the instrument, which are updated every 10 minutes (for example) or longer (for example 100 minutes). Another output signal is the short term spacecraft attitude data to the instrument provided from the 100 Hz (for example) discrete integrator 23. The third output signal is the short term compensated rate signal provided from sensor dynamics and latency compensator 25.

It will be understood that the true spacecraft angular rate input signal shown in FIG. 2 includes three separate input signals of x-axis angular rates, y-axis angular rates and z-axis angular rates. Similarly, the spacecraft attitude signal shown inputted every 10 minutes into summer 24 and the output signal from to integrator 23 are also three separate signals of roll angles, pitch angles and yaw angles. Furthermore, the angular rates output from compensator 25 are three separate output signals of x-axis angular rates, y-axis angular rates and z-axis angular rates.

Still referring to FIG. 2, the true spacecraft angular rate is corrupted by rate sensor dynamics, which in this example is caused by a 10 Hz second order linear transfer function. The spacecraft angular rate is further corrupted by data latency transmission from the spacecraft to the instrument, which in this example is a data latency of 0.007 seconds. The corrupted angular rate inputted to the instrument is integrated at a predetermined sample rate—in this example 100 Hz. The spacecraft attitude is also used to initialize the estimated spacecraft attitude at the start of the process and further re-initialized periodically—in this example once every 10 minutes. The resulting estimated spacecraft attitude, without the advantage of compensator 25, has an error, because the true spacecraft angular rate is corrupted by data transmission latency and by rate sensor dynamics.

The present invention, therefore, uses a feed-forward path including rate sensor dynamics and latency compensator 25, as shown in FIG. 2. The compensation output signal is added by summer 24 to the integrated angular rate to produce a more accurate estimated spacecraft attitude signal. The compensation provided by compensator 25 in the feed-forward path advantageously reduces the errors in the estimated spacecraft attitudes provided to the instrument.

Figure 3:
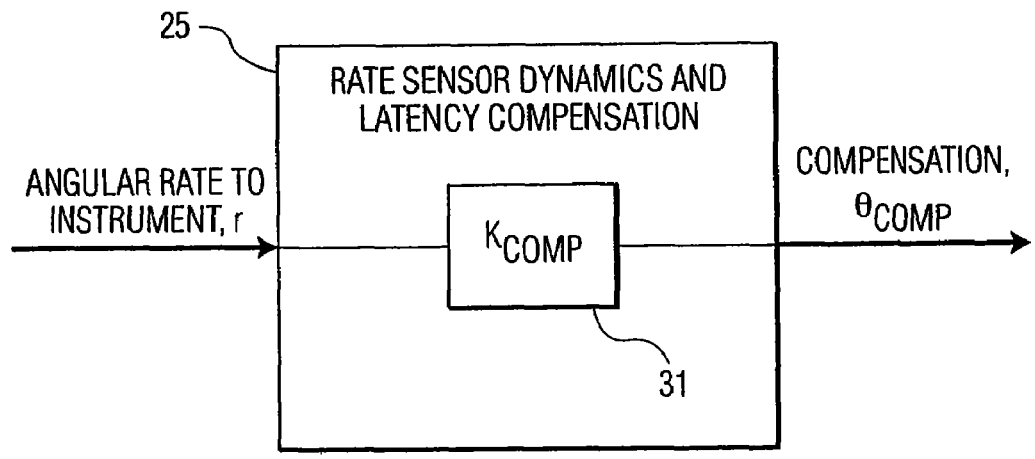
FIG. 3 is a block diagram of a rate sensor dynamics and latency compensator shown in FIG. 2, in accordance with an embodiment of the present invention.
Figure 4:
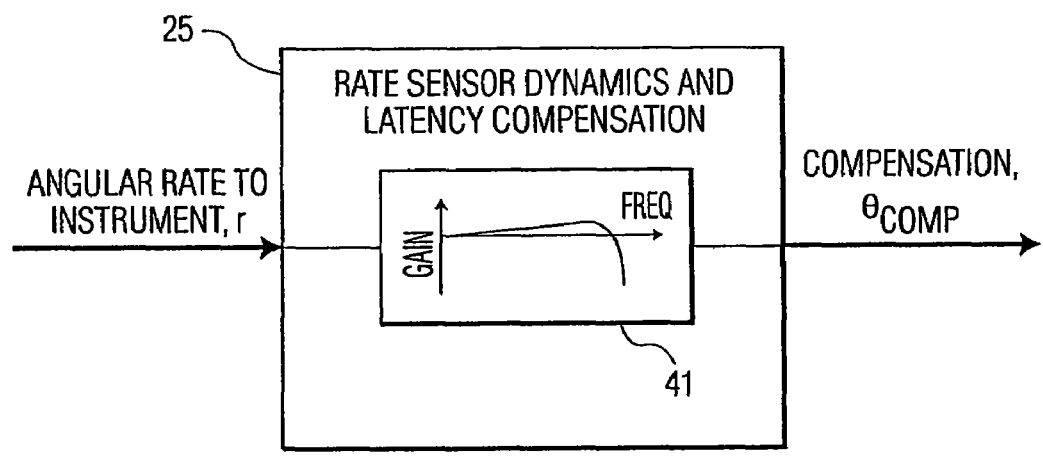
FIG. 4 is another block diagram of a rate sensor dynamics and latency compensator shown in FIG. 2, in accordance with an embodiment of the present invention.

The compensation may be a simple gain function (FIG. 3) or a complex frequency function (FIG. 4). The compensator operates directly on the angular rates forwarded from the inertial sensor to the instrument. No differentiation, or derivative-like action, of the spacecraft attitude or the estimated spacecraft attitude is required by the present invention.

Figure 5:
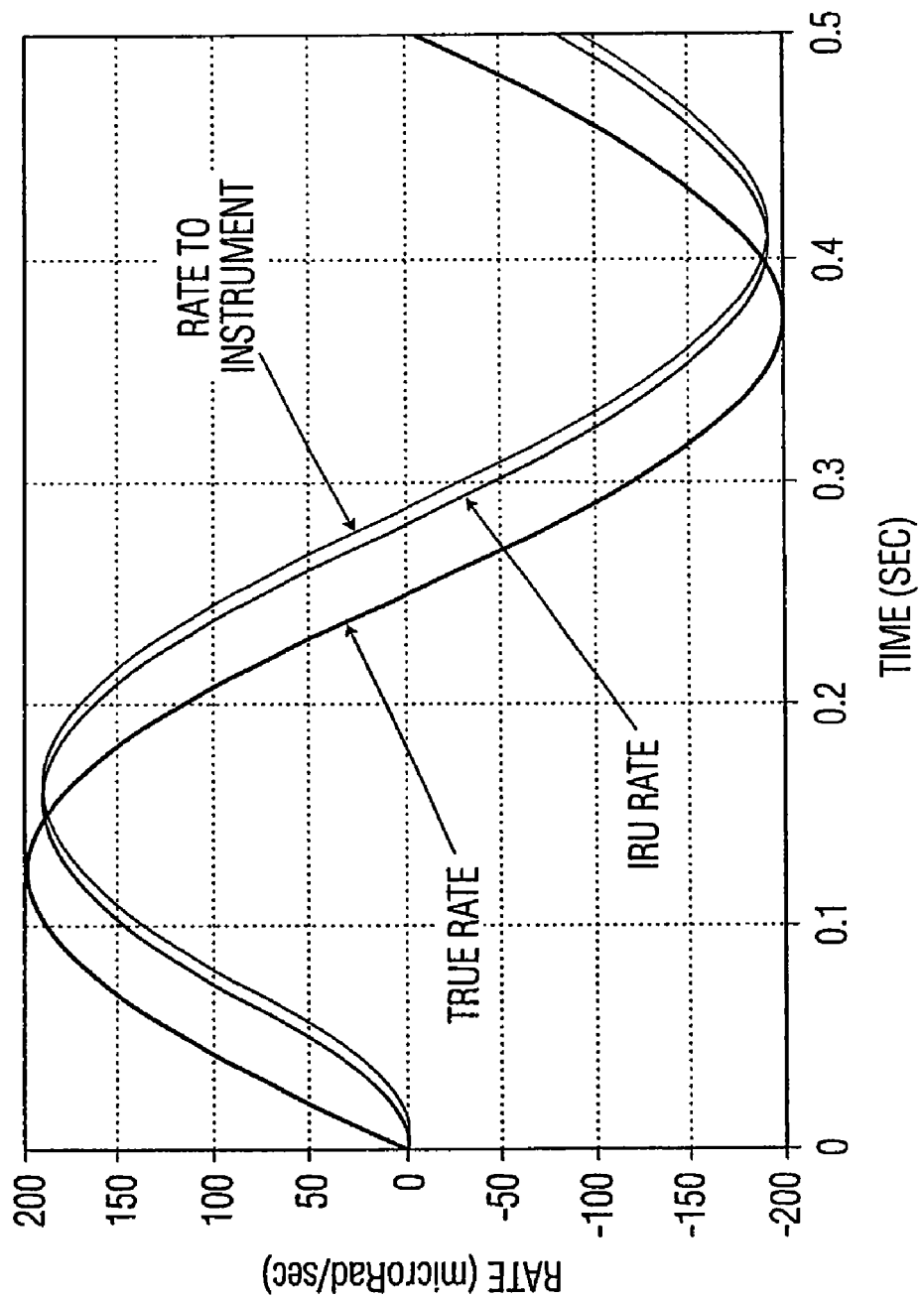
FIG. 5 is a plot of attitude rate versus time, showing differences between the attitude rates sensed by an IRU and the attitude rates provided to an instrument without compensation.
Figure 6:
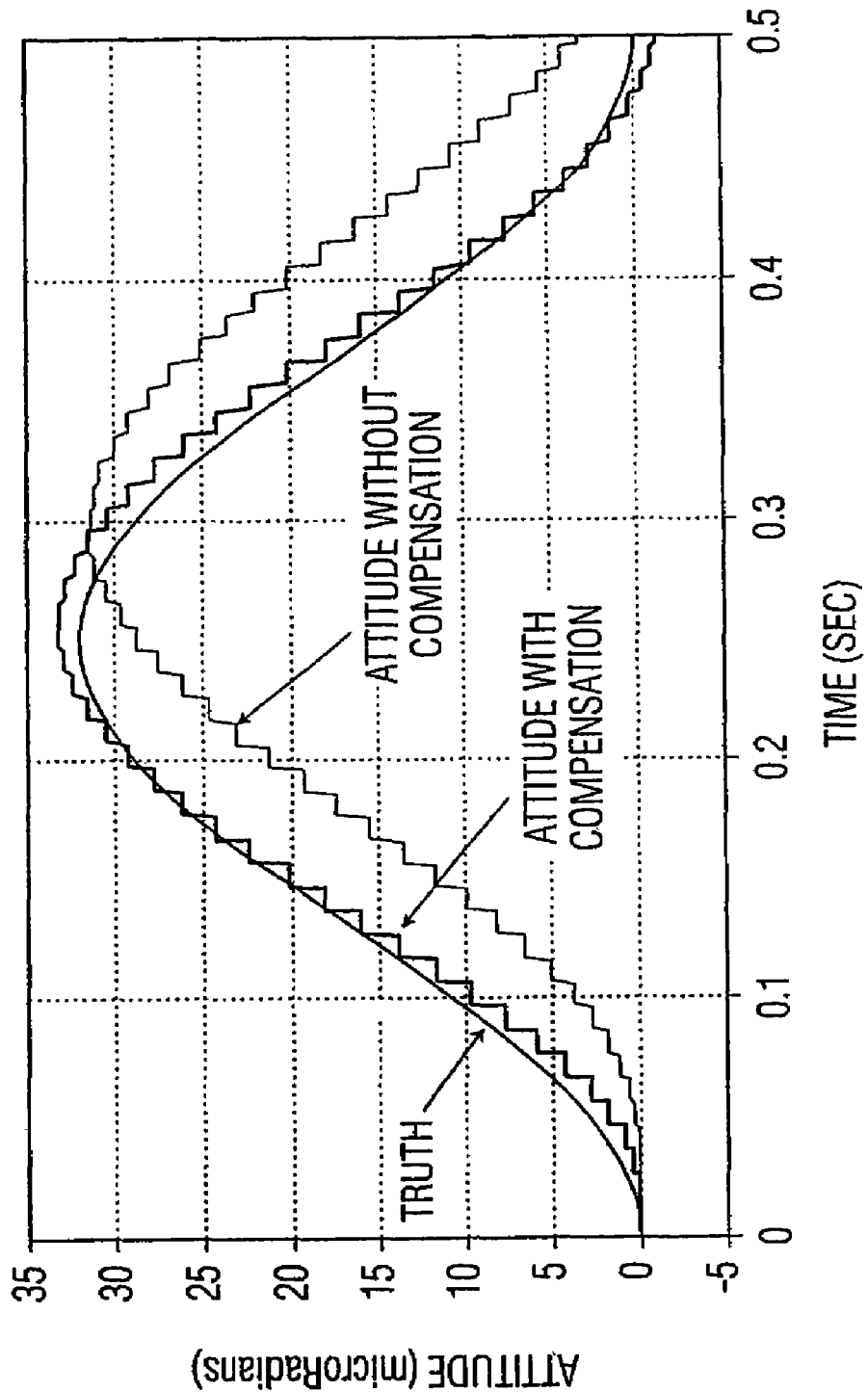
FIG. 6 is a plot of attitude versus time, showing differences between the attitudes provided to an instrument without compensation and the attitudes provided to the same instrument with compensation.
Figure 7:
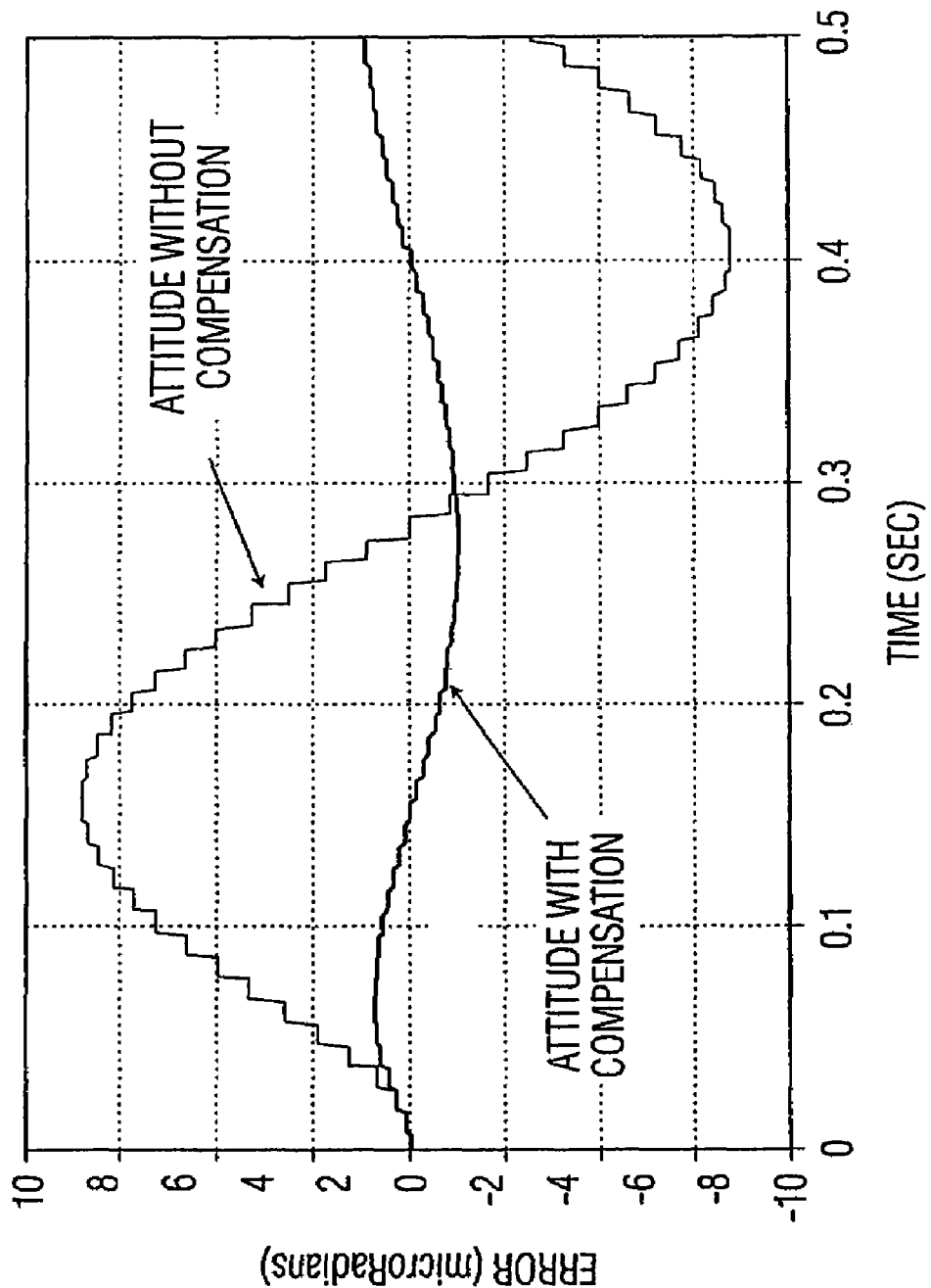
FIG. 7 is a plot of error versus time, showing differences between the errors in the attitude data provided to the instrument with compensation and the errors in the attitude data provided to the instrument without compensation, in accordance with an embodiment of the present invention.

The present invention was tested by a simulated 2 Hz, 200 micro-radians per second spacecraft sinusoidal true angular rate. The true rate was passed through a 10 Hz second order transfer function representing the rate sensor is dynamics. The data transmission latency between the spacecraft and the instrument was set to 0.007 seconds (as an example). FIGS. 5 through 7 show results of the simulation.

FIG. 5 shows the amplitudes of three angular rate signals as they vary as a function of time. The amplitude of the true angular rate was reduced and delayed (phase shifted) by an IRU rate sensor with 10 Hz dynamics (as an example). The angular rate received by the instrument was further delayed by a 0.007 seconds data transmission latency.

The true angular rate was integrated (using a $4^{th}$ order Runge Kutta with a 0.0005 second step size) to obtain the true attitude (the truth trace shown in FIG. 6). The corrupted angular rate received by the instrument without compensation was integrated at a 100 Hz sampling rate to obtain the attitude without compensation, as shown in FIG. 6. The attitude with compensation shown in FIG. 6 is the sum of the attitude without compensation and the output signal from rate sensor dynamics and latency compensator 25. In this example, the compensation used by compensator 25 is a simple gain with a value of 0.045. FIG. 6 clearly shows that compensator 25 of the present invention provides much closer performance to the truth than is provided by the performance of a system without using compensator 25 of the present invention.

The attitude errors with and without the rate sensor dynamics and latency compensator of the present invention are shown in FIG. 7. The peak attitude error without the compensation is 8.5 micro-radians. The compensator reduces the peak estimated attitude error to 1.24 micro-radians, which is a factor of about 0.15 reduction.

It will be appreciated that the rate sensor dynamics and latency compensator may have a fixed gain function that is tuned to any expected latency, any rate sensor dynamics, and any expected spacecraft rotational motion frequencies. If necessary, the gain function of the compensator may be tailored to have a gain that varies as a function of frequency.

Referring next to FIG. 3, there is shown a first embodiment of rate sensor dynamics and latency compensator 25. As shown, compensator 25 includes a constant gain, or fixed gain transfer function, generally designated as 31. In this embodiment, the compensation output, $\theta_{comp}$), is related to the compensation input, r, by the compensation gain constant, $K_{comp}$:

$$\theta_{comp} = K_{comp} r$$

Referring next to FIG. 4, there is shown a second embodiment of rate sensor dynamics and latency compensator 25. As shown, compensator 25 includes a transfer function that varies as a function of frequency, generally designated as 41. In this embodiment, the compensation output, $\theta_{comp}$, is related to the compensation input, r, by a general difference equation. A representative second-order difference equation is:

$$\theta_{comp}(n) = -a_1 \theta_{comp}(n-1) - a_2 \theta_{comp}(n-2) + b_0 r(n) + b_1 r(n-1) + b_2 r(n-2)$$

where the constants $a_1$, $a_2$, $b_0$, $b_1$, and $b_2$ are chosen to match the desired transfer function. The desired transfer function may be of any order.

It will be understood that compensators 31 and 41 may be of an analog implementation or a digital implementation.

It will be understood that the present invention may be used with any instrument, or device disposed in a vehicle, or spacecraft, where the instrument, or device requires short term attitude information from a remote device having a rate sensor disposed in the same vehicle, or spacecraft.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A compensator for reducing attitude errors in orientation of an instrument, the compensator comprising
   a transfer function module configured to operate on an input signal and, in response, provide a compensated output signal,
   the transfer function module coupled to an angular rate sensor for receiving, as the input signal, angular rates from the angular rate sensor, and
   the transfer function module coupled to the instrument for providing compensated angular rates as the compensated output signal,
   wherein the transfer function module operates in an open loop mode to reduce the attitude errors of the instrument, and operates free-of any feedback loop;
   an integrator coupled in parallel with the transfer function module for integrating the input signal and providing a non-compensated output signal, and
   a summer for combining the non-compensated output signal and the compensated output signal to form estimated attitude of the instrument;
   wherein the input signal includes angular rate errors due to rate sensor dynamics and data transmission latency, and
   the estimated attitude of the instrument includes less errors than the input signal.

2. The compensator of claim 1 wherein
   the transfer function module operates as a fixed gain between the input signal and the compensated output signal.

3. The compensator of claim 1 wherein
   the transfer function module operates as a variable gain between the input signal and the compensated output signal which is a function of frequency.

4. The compensator of claim 1 wherein
   the input signal includes at least one of x-axis angular rates, y-axis angular rates and z-axis angular rates, and
   the compensated output signal includes a corresponding one of x-axis angular rates, y-axis angular rates and z-axis angular rates.

5. The compensator of claim 1 including
   an inertial reference unit (IRU) for providing an attitude reference signal directly to the summer, and
   the summer combining the attitude reference signal to both the non-compensated output signal and the compensated output signal to form the estimated attitude of the instrument.

6. The compensator of claim 1 including
   the instrument and the angular rate sensor both disposed in a spacecraft, wherein
   the input signal includes angular rates in a spacecraft coordinate system, and
   the output signal includes attitude angles in the spacecraft coordinate system.

7. A system comprising
   an angular rate sensor disposed in a vehicle for providing angular rates of the vehicle,
   an instrument disposed in the vehicle providing attitude control with respect to a line-of-sight reference,
   the instrument including an integrator configured to integrate the angular rates of the vehicle to form non-compensated attitudes,
   a compensator coupled across the integrator, in a feed forward loop, for receiving the angular rates of the vehicle and outputting compensated angular rates of the vehicle, and
   a summer for combining the non-compensated attitudes and the compensated angular rates of the vehicle to form an estimated vehicle attitude for controlling the instrument with respect to the line-of-sight reference;
   wherein the integrator provides errors due to rate sensor dynamics and data transmission latency, and
   the estimated vehicle attitude for controlling the line-of-sight includes less errors than the errors provided by the integrator.

8. The system of claim 7 wherein
   the compensator is configured to provide error compensation to the instrument free-of any feedback loop that has an error signal.

9. The system of claim 7 wherein
   the compensator includes a transfer function providing a fixed gain to the received angular rates of the vehicle and outputting the compensated angular rates of the vehicle.

10. The compensator of claim 7 wherein
    the compensator includes a transfer function providing a variable gain as a function of frequency to operate on the received angular rates of the vehicle and output the compensated angular rates of the vehicle.

11. The compensator of claim 7 including
    an inertial reference unit (IRU) coupled to the summer for providing vehicle attitude to the summer at a predetermined rate.

12. The compensator of claim 7 wherein
    the vehicle is one of an aircraft, a spacecraft, or a ground vehicle.

13. A method of reducing attitude errors in orientation of an instrument, where the instrument is disposed on a vehicle, comprising the steps of:
(a) providing angular rates to the instrument from an inertial sensor disposed in the vehicle;
(b) integrating the angular rates, by the instrument, to provide non-compensated attitudes for controlling a line-of-sight by the instrument;
(c) multiplying the angular rates from the inertial sensor, by the instrument, by a predetermined transfer function to provide compensated angular rates;
(d) summing the non-compensated attitudes and the compensated angular rates to provide estimated vehicle attitudes for controlling the line-of-sight by the instrument;
using the estimated vehicle attitudes for controlling the line-of-sight of the instrument, and
configuring the estimated vehicle attitudes to be free-of any feedback error loop from the instrument or from the vehicle.

14. The method of claim 13 wherein
step (c) includes multiplying the angular rates by a fixed constant value.

15. The method of claim 13 wherein
step (c) includes multiplying the angular rates by a value that varies as a function of frequency.

16. The method of claim 13 wherein
step (d) includes
receiving vehicle attitudes from an inertial sensor disposed in the vehicle, and
summing the received vehicle attitudes with the non-compensated attitudes and the compensated angular rates to provide the estimated vehicle attitudes for controlling the line-of-sight by the instrument.

17. A compensator for reducing attitude errors in orientation of an instruments, the compensator comprising
a transfer function module configured to operate on an input signal and, in response, provide a compensated output signal,
the transfer function module coupled to an angular rate sensor for receiving, as the input signal, angular rates from the angular rate sensor, and
the transfer function module coupled to the instrument for providing compensated angular rates as the compensated output signal,
wherein the transfer function module operates in an open loop mode to reduce the attitude errors of the instrument, and operates free-of any feedback loop,
the input signal includes angular rate errors due to rate sensor dynamics and data transmission latency, and
the estimated attitude of the instrument includes less errors than the input signal.

* * * * *

UNITED STATES PATENT AND TRADEMARK OFFICE
CERTIFICATE OF CORRECTION

PATENT NO.        : 7,729,816 B1                                            Page 1 of 1
APPLICATION NO.   : 11/337889
DATED             : June 1, 2010
INVENTOR(S)       : Robert Josselson It is certified that error appears in the above-identified patent and that said Letters Patent is hereby corrected as shown below:

Column 7, line 9, "$\theta_{comp)}$ is related" should read -- $\theta_{comp,}$ is related --

Signed and Sealed this

Third Day of August, 2010

David J. Kappos
*Director of the United States Patent and Trademark Office*